United States Patent
Klimt et al.

(10) Patent No.: US 8,544,618 B2
(45) Date of Patent: Oct. 1, 2013

(54) BRAKE PAD FOR A PARTIALLY-LINED DISK BRAKE

(75) Inventors: Anja Klimt, Frankfurt am Main (DE); Matthias Würz, Oberursel (DE); Christian Piehler, Frankfurt (DE)

(73) Assignee: Continental Engineering Services GmbH (DE)

( * ) Notice: Subject to any disclaimer, the term of this patent is extended or adjusted under 35 U.S.C. 154(b) by 522 days.

(21) Appl. No.: 12/682,113

(22) PCT Filed: Apr. 29, 2008

(86) PCT No.: PCT/EP2008/055241
§ 371 (c)(1), (2), (4) Date: Apr. 8, 2010

(87) PCT Pub. No.: WO2009/049930
PCT Pub. Date: Apr. 23, 2009

(65) Prior Publication Data
US 2010/0219030 A1     Sep. 2, 2010

(30) Foreign Application Priority Data

Oct. 9, 2007  (DE) .......................... 10 2007 048 489
Mar. 8, 2008  (DE) .......................... 10 2008 013 268

(51) Int. Cl.
*F16D 65/14*     (2006.01)

(52) U.S. Cl.
USPC ................ 188/250 F; 188/250 B; 188/73.37; 29/524; 29/525.05; 29/505

(58) Field of Classification Search
USPC .................... 188/73.37, 250 F, 250 B, 250 R, 188/250 G, 253, 261; 29/524, 525.05, 896.91, 29/505

See application file for complete search history.

(56) References Cited

U.S. PATENT DOCUMENTS

| | | | | |
|---|---|---|---|---|
| 4,995,482 A | * | 2/1991 | Kobayashi et al. | 188/73.1 |
| 5,416,962 A | * | 5/1995 | Passarella | 29/896.91 |
| 5,509,508 A | * | 4/1996 | Evans | 188/73.38 |
| 5,706,917 A | * | 1/1998 | Matsuzaki | 188/73.38 |

(Continued)

FOREIGN PATENT DOCUMENTS

| | | |
|---|---|---|
| DE | 196 02 037 A1 | 7/1997 |
| DE | 10 2006 052 178 A1 | 6/2007 |

(Continued)

*Primary Examiner* — Thomas J Williams
*Assistant Examiner* — Mariano Sy
(74) *Attorney, Agent, or Firm* — RatnerPrestia

(57) ABSTRACT

A brake pad for a partially-lined disk brake and a method for making such a brake pad. The brake pad has a back plate, a friction lining arranged fixedly on a front side of the back plate and a damping plate provided on a rear side. At least one hook-shaped guide end adjoins a body region of the back plate in a circumferential direction. The guide end has an elevation with a material thickness D increased in relation to a material thickness d of the body region. At least one abutment face for tangential abutment in a circumferential direction is provided on the guide end and a support face is provided thereon for radial support in a radial direction. The damping plate has at least one bent-over bracket which rests against the radial support face in a bracket region of the back plate. The damping plate is offset axially to the rear relative to the bracket region in the body region of the back plate.

7 Claims, 2 Drawing Sheets

(56) References Cited

U.S. PATENT DOCUMENTS

| | | |
|---|---|---|
| 5,934,417 A | 8/1999 | Kobayashi et al. |
| 5,975,252 A * | 11/1999 | Suzuki et al. ............... 188/73.1 |
| 6,056,091 A | 5/2000 | Krug et al. |
| 6,116,384 A * | 9/2000 | Matsumoto et al. ....... 188/73.31 |
| 7,152,717 B2 | 12/2006 | Lelievre et al. |
| 7,370,736 B2 * | 5/2008 | Anda et al. ................ 188/73.36 |
| 7,481,304 B2 * | 1/2009 | Tsurumi et al. ........... 188/73.36 |
| 7,926,627 B2 * | 4/2011 | Wake et al. ................ 188/73.37 |

FOREIGN PATENT DOCUMENTS

| | | |
|---|---|---|
| EP | 1 217 247 A2 | 6/2002 |
| GB | 2 222 646 A | 3/1990 |
| JP | 3-113135 A | 5/1991 |
| JP | 2006-153139 A | 6/2006 |
| WO | WO 2007057435 A1 * | 5/2007 |

* cited by examiner

BRAKE PAD FOR A PARTIALLY-LINED DISK BRAKE

CROSS REFERENCE TO RELATED APPLICATIONS

This application is the U.S. national phase application of PCT International Application No. PCT/EP2008/055241, filed Apr. 29, 2008, which claims priority to German Patent Application No. 10 2007 048 489.7, filed Oct. 9, 2007, and German Patent Application No. 10 2008 013 268.3, filed Mar. 8, 2008, the contents of such applications being incorporated by reference herein.

FIELD OF THE INVENTION

The invention relates to a brake pad for a partially-lined disk brake with a back plate, wherein a friction lining is arranged fixedly on a front side of the back plate and a damping plate is provided on a rear side, at least one hook-shaped guide end adjoining a body region of the back plate, which guide end has an elevation such that a component thickness of the guide end is increased in relation to a component thickness of the body region, and wherein at least one abutment face for tangential abutment in a circumferential direction is present on the guide end and a support face is provided thereon for radial support in a radial direction, the damping plate having at least one bent-over bracket which rests against the radial support face in a bracket region of the back plate.

BACKGROUND OF THE INVENTION

In a disk brake of this type a brake caliper extends around an axially rotatable brake disc, at least one pair of brake pads being arranged axially displaceably in the brake caliper. The brake disk can be acted upon by the brake pads, the circumferential and radial forces arising through the braking being transmitted to the brake caliper via the brake pads, since the brake pads are supported in the brake caliper in a circumferential direction by means of abutment faces and in a radial direction by means of support faces.

Known from DE 196 02 037 A1, which is incorporated by reference, is a brake pad with a damping plate, an L-shaped or U-shaped bracket being mounted between a holder of the brake caliper and the brake pad for noise-damping. For this reason the attachment of the bracket to the damping plate is designed to be relatively soft and flexible, and therefore is susceptible to vibrational movements. With this construction the brake pad together with the damping plate is compressed and axially displaced as braking pressure is applied in the brake caliper. Because the bracket does not rest firmly against the brake pad but has a contact with the back plate which is undefined and suffers from free play, there is a possibility that a stick-slip effect with movements in the micrometer range builds up between the bracket and the holder in the compression phase. That is to say that the bracket executes a movement alternating between sticking and slipping. This effect can be transmitted to the holder and the attached components and can therefore excite vibration in the system. Even greasing of the sliding faces does not offer a permanent solution for this vibration phenomenon, since such greasing is washed out within a few thousand kilometers in normal operation. However, this known design concept is not applicable to brake pads with an elevation at the guide end. Nevertheless, brake pads with a thickened portion of the back plate are coming increasingly into use as a result of the tendency towards ever heavier vehicles and through efforts to reduce the weight of vehicles in order to reduce $CO_2$ emissions.

Hence, a generic brake pad with a damping plate and thickened guide ends is known from DE 10 2006 052 178 A1, which is incorporated by reference, wherein at least one tangential flange part is arranged on the damping plate, extends around a tangential side face of the back plate and merges into the bracket. In other words, the tangential flange part bypasses the region of the elevation of the back plate. This damping plate has proved disadvantageous with regard to production, handling and strength.

SUMMARY OF THE INVENTION

It is an object of the invention to specify a brake pad with a damping plate and thickened guide ends while avoiding the disadvantages of the prior art. In addition, it is an object to specify a method for producing a damping plate for a brake pad.

One of the objects of the invention is achieved according to aspects of the invention in that, in the body region of the back plate, the damping plate is offset axially to the rear in relation to the bracket region. The design concept of a damping plate with integral L-shaped or U-shaped bracket known from DE 196 02 037 A1 can thereby also be applied to brake pads with an elevation on the guide end.

A shape which is particularly optimized with regard to the strength of the damping plate is preferably obtained if a bending region which merges into a bracket region adjoins a body region of the damping plate.

According to an advantageous embodiment of the invention, the bracket region of the damping plate rests at least partially against a face of the elevation which is parallel to the back plate, whereby a suppression of noise-generating vibrations is achieved.

The bending region is preferably configured, after a bending process of the damping plate, as a face which is oblique with respect to the body region and the bracket region, whereby the strength of the damping plate can be further improved.

Corners which are troublesome during handling can be avoided, according to an advantageous development of the invention, in that the bracket region is provided with an angled corner on a face located opposite the bracket.

A strong and rigid attachment of the damping plate can be obtained in that a partial region of the bracket bears under preload against the front side of the back plate in the bracket region. Micro-movements of the components which can cause disturbing noises are avoided.

One of the objects of the invention is further achieved by a method for producing a damping plate for a brake pad wherein the brake pad comprises a back plate and a friction lining which is arranged on a front side of the back plate, wherein at least one hook-shaped guide end adjoins a body region of the back plate in the circumferential direction and has an elevation such that a component thickness of the guide end is increased in relation to a component thickness of the body region, and wherein a bracket is formed integrally on the damping plate, which method comprises the following steps: punching of an unbent blank of the damping plate from flat sheet metal; bending of a bending region which adjoins a body region, so that in the body region the damping plate is offset axially to the rear relative to a bracket region which adjoins the bending region, and bending over of the bracket so that the bent-over bracket can be placed against a radial support face of the guide end.

A partial region of the bracket is preferably bent over in such a manner that it (the partial region) can be placed under preload against the front side of the back plate in the bracket region.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
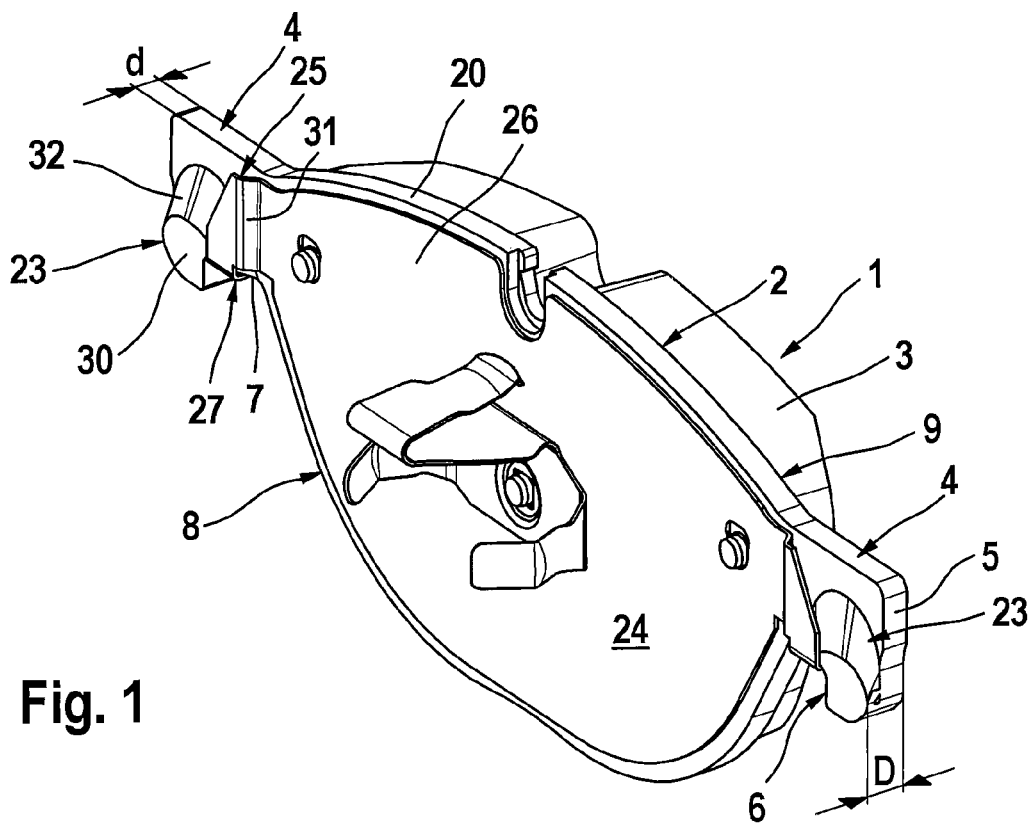
FIG. 1 shows a guide system of a disk brake with a holder and a brake pad according to the invention.
Figure 2:
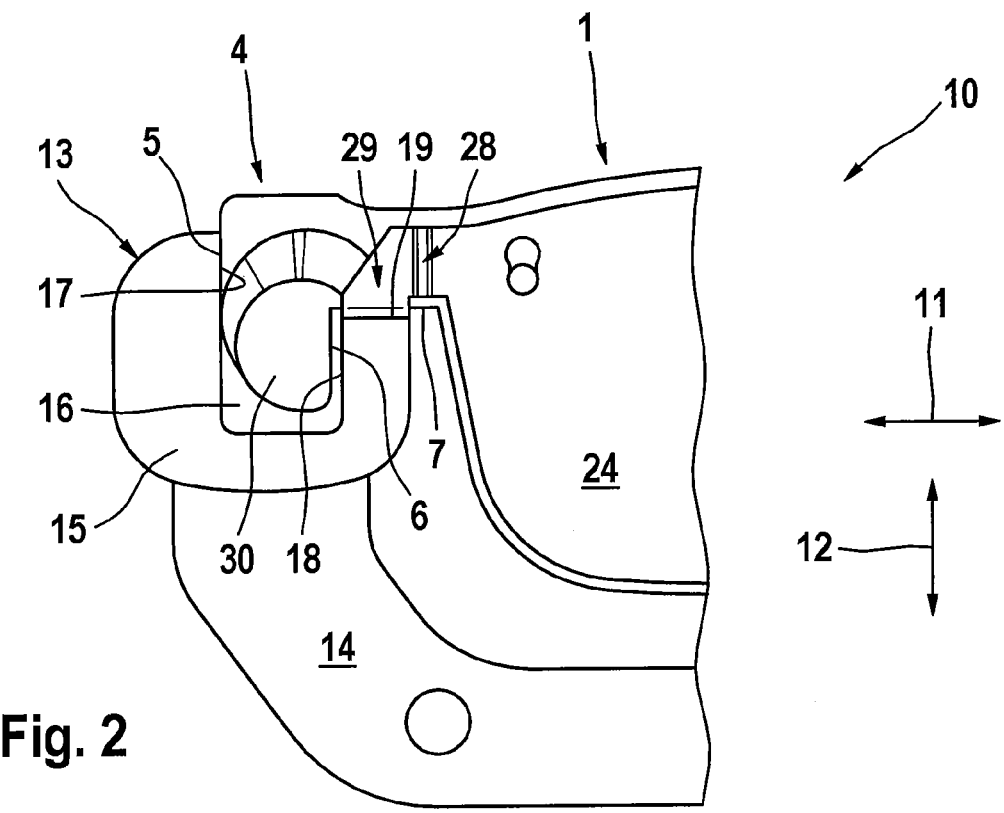
FIG. 2 is a perspective view of a rear side of the brake pad with damping plate.

FIG. 1 shows a brake pad 1 in a perspective view. As shown in FIG. 2, this brake pad 1 is guided in a guide system 13 of a partially-lined disk brake 10 comprising a holder 14 and a holding arm 15 with guide shaft 16.

The brake pad 1 comprises a back plate 2, a damping plate 24 and a friction lining 3 which is fixedly attached to a front side 9 of the back plate 2 by pressing and firing processes. The holding arms 15 of the holder 14 extend around a brake disk (not shown here). This brake disk is mounted rotatably about an axis of rotation. During a braking process the brake disk is acted upon axially on both sides by a pair of brake pads 1. As this happens, as can be seen from FIG. 2, braking forces acting on the brake pads 1 in a circumferential direction 11 are transmitted to the holder 14 via tangential holder abutment faces 17, 18 in the guide shafts 16. Further forces, for example momentum and weight forces which act in a radial direction 12 with respect to the brake disc, can be transmitted to the holder 14 via radial holder support faces 19.

For this purpose a body region 20 of the back plate 2, which carries the friction lining 3, merges on each side in a circumferential direction 11 into a hook-shaped guide end 4. The latter engages in the guide shaft 16 of the holding arm 15. Brake pads with only one hook-shaped guide end 4 on one side are also possible; in the exemplary embodiment referred to here, however, a brake pad 1 which is symmetrical in the circumferential direction 11 is assumed. For the tangential abutment of the brake pad 1 on the holder in the circumferential direction 11, two tangential abutment faces 5, 6 are provided on the guide end 4, which abutment faces 5, 6 come into force-transmitting contact with the holder abutment faces 17, 18 during a braking process. It can be seen that both abutment faces 5, 6 on a guide end 4 cannot come into effective engagement simultaneously. If the guide end 4 shown in FIG. 2 is located on the exit side in the direction of rotation of the brake disc, this guide end 4 is subjected to a pressure load, because the braking forces are transmitted via the abutment face 5 and the corresponding holder abutment face 17. If the direction of rotation is selected such that the guide end 4 is located on the entrance side with respect to the brake disc, it is subjected to a traction load and the flow of forces leads, via the pair of faces comprising the abutment face 6 of the guide end 4 and the corresponding holder abutment face 18 of the guide shaft 16, to the holder 14. Forces acting radially are transmitted to the radial holder support faces 19 of the holder 14 via support faces 7 in the guide end 4.

Between the support face 7 and the radial holder support face 19 of the holder 14, a bracket 27, which adjoins the damping plate 24 via a bending region 28 and a body region 26, is arranged on the damping plate 24 in a bracket region 25 of the back plate 2. A detailed description of the configuration of the damping plate can be found in the description below.

This bracket 27 serves, inter alia, to facilitate the axial displaceability of the brake pad 1 in the guide shaft 16. For this purpose it is usually produced from a material with a low slip/stick coefficient or is coated correspondingly. To counteract noise-generation the bracket 27 must be connected very rigidly to the back plate 2. Noises referred to as creaking are produced when the brake is actuated, the brake pad 1 is displaced in the guide shaft 16, and the bracket 27 performs a constant alternation of slipping and sticking in the guide shaft 16. This very high-frequency alternating motion is transmitted to the holder 14 and causes noise-radiation. Because the bracket 27 is connected as rigidly as possible to the back plate 2, the movement possibilities of the bracket 27 are restricted and the amplitudes of the vibration minimized. The abutment of the bracket 27 on the back plate 2 is defined in this way. Relative micro-movements are minimized in amplitude to such an extent that they no longer develop into noise-relevant problems.

It can be seen in particular from FIG. 1 that the guide end 4 of the back plate 2 has an integrally-formed elevation 23 for reinforcement and at the same time for enlargement of the support and abutment faces 5, 6, 7. The component thickness D of the guide end 4 is thereby at least partially increased, especially at the support face 7, in relation to a component thickness d of the body region 20. The elevation 23 extends preferably into the section of the guide end 4 in which the support face 7 merges into the abutment face 6, and is disposed in a substantially circular manner around the section of the support face 7 and the abutment face 6. This is a section which is heavily stressed during braking, and at which only a limited load-carrying cross section of the back plate 2 is available. The integrally-formed elevation 23 therefore also produces a strengthening of this strength-critical cross section. In order to influence the flow of stress in the back plate 2 in a manner appropriate to the loading thereof, a transition between a face 30 of the elevation 23 parallel to the back plate 2 and an unthickened region of the guide end 4 is configured as a chamfer 32. At the same time the elevation 23 is formed integrally on a rear side 8 of the back plate 2 oriented away from the friction lining 3. The quality of brake pad guidance even with a heavily worn friction lining 3 is thereby improved, since a support face 7 of sufficient dimensions is always available.

The elevation 23 is preferably formed integrally on the back plate 2 by material displacement. With regard to production, a combination of reshaping and fine blanking or stamping processes is advantageously used for this purpose. In this case both the shape of the elevation 23 is defined and the contour of the back plate 2 is determined. In general, the back plate 2 is obtained from a raw blank by punching or fine blanking from flat sheet metal. The desired form of the elevation 23 is determined by suitable shaping of a negative recess in a pressure pad or ejector during the fine blanking, reshaping or pre-punching. Alternatively, the elevation 23 may be formed with the support face 7 and the abutment face 6 during a reshaping process, in particular an upsetting process. The remaining contour of the back plate 2, with the exception of the support face 7 and the abutment face 6, is determined in a following fine blanking or punching operation. The typical component thickness D of the elevation 23 is approximately 1.1 to 1.5 times the component thickness d of the body region 20 of the back plate 2.

Known damping plates for brake pads 1 with the elevations 23 described have at least one tangential flange part which extends around a tangential side face of the back plate and merges into the bracket. Openings for the elevations 23 are therefore formed in the damping plate. However, this configuration of the damping plate is complex and costly and is disadvantageous, in particular, with regard to the handling and strength of the damping plate.

Figure 3:
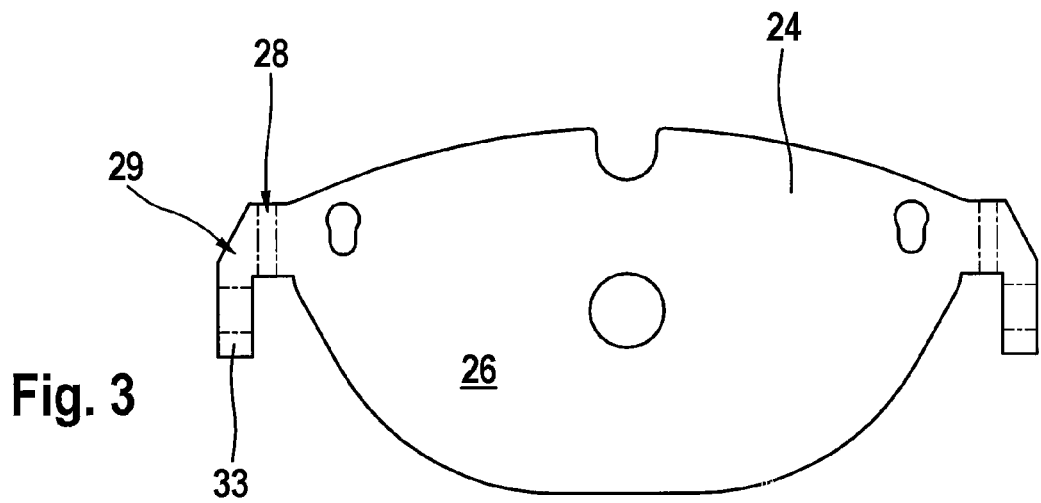
FIG. 3 shows an unbent blank of the damping plate from FIGS. 1 and 2.

These disadvantages are avoided in accordance with the invention, as is apparent from the following description. For this purpose FIG. 3 shows an unbent blank of the damping plate 24 which is shown in FIGS. 1 and 2. A perspective view of the damping plate 24 after a bending process can be seen in FIG. 4. FIG. 5 further shows a side view of the damping plate 24 according to FIGS. 3 and 4 after bending.

Figure 4:
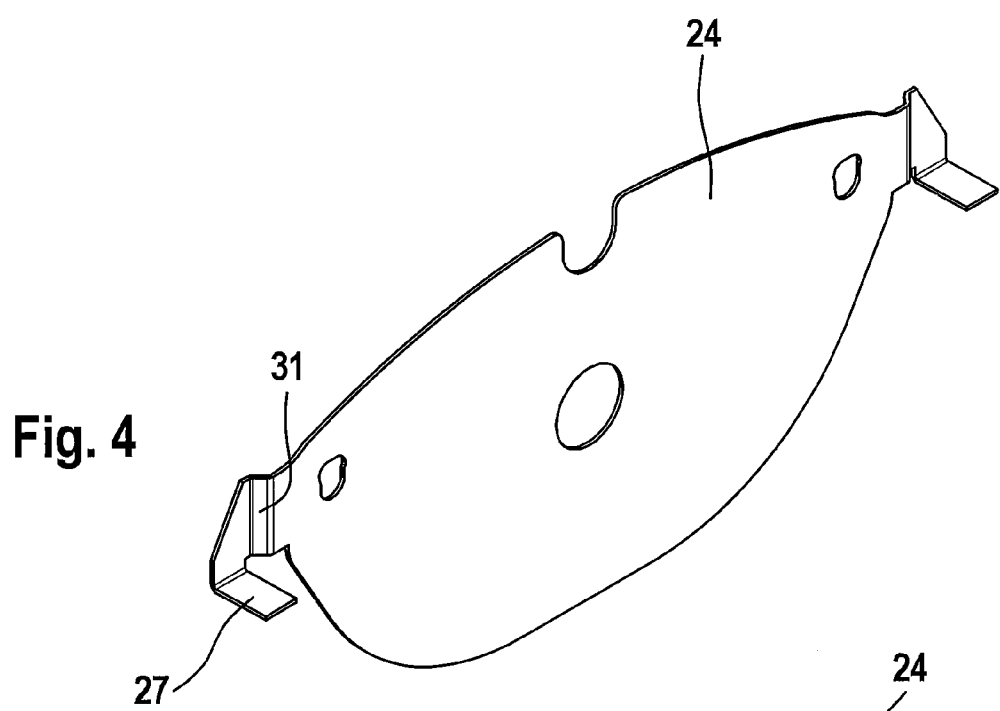
FIG. 4 is a perspective view of the damping plate after a bending process.
Figure 5:
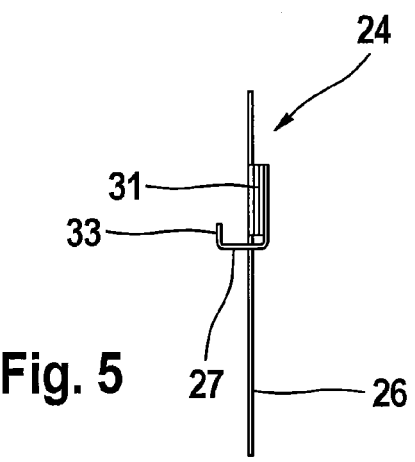
FIG. 5 is a side view of the damping plate according to FIGS. 3 and 4 after bending.

As is apparent, in particular, from FIGS. 1, 4 and 5, in the body region 20 of the back plate 2 the damping plate 24 is offset axially to the rear relative to the bracket region 25. Adjoining the body region 26, already described, of the damping plate 24 is the bending region 28, which is configured, after a bending process of the bending plate 24, as an oblique face with respect to the body region 26. This bending region 28 adjoins a bracket region 29 in which the bracket 27 is arranged. This configuration of the damping plate 24 produces a shape which is especially optimized for strength.

A partial region 33 of the bracket 27 which can be seen in FIG. 5 is bent over during production in such a manner that, after the damping plate 24 has been mounted to the back plate 2, the partial region 33 rests under preload against the front side 9 of the back plate 2 in the bracket region 25. A strong and rigid attachment of the damping plate 24 to the back plate 2 is thereby achieved, and micro-movements of the components which can cause disturbing noises are avoided.

At the same time, as shown in FIG. 1, the bracket region 29 of the damping plate 24 rests at least partially against a face 30 of the elevation 23 which is parallel to the back plate 2, whereby a suppression of noise-generating vibrations is also achieved.

In addition, the bracket region 29 is cut at an angle on a face opposite the bracket 27 in order to avoid troublesome corners during handling.

The production of the previously-described damping plate 24 comprises the following steps:
punching of an unbent blank of the damping plate 24 from flat sheet metal,
bending of the bending region 28 which adjoins the body region 26, so that the damping plate 24 is offset axially to the rear in the body region 26 relative to the bracket region 29 which adjoins the bending region 28, and
bending over of the bracket 27 so that the bent-over bracket 27 can be placed against the radial support face 7 of the guide end 4.

In a further bending step the partial region 33 of the bracket 27 is bent over so that it (the partial region 27) can be placed under preload against the front side 9 of the back plate 2 in the bracket region 25.

The invention claimed is:

1. A brake pad for a partially-lined disk brake with a back plate, the brake pad comprising:
a friction lining fixedly arranged on a front side of the back plate and a damping plate provided on a rear side, and
at least one guide end adjoining a body region of the back plate in a circumferential direction, wherein the guide end has an elevation such that a component thickness (D) of the guide end is increased in relation to a component thickness (d) of the body region, the guide end including at least one abutment face for tangential abutment in the circumferential direction and a support face for radial support in a radial direction,
wherein the damping plate has at least one bent-over bracket which rests against the radial support face in a bracket region of the back plate and a bracket surface of the damping plate that is defined on the bent-over bracket is parallel with and offset axially from a body surface of the damping plate in the body region of the back plate,
wherein the bracket surface of the damping plate rests at least partially against a face of the elevation parallel to the back plate.

2. The brake pad for a partially-lined disk brake as claimed in claim 1, wherein a bending region adjoins a body region of the damping plate and merges into the bracket region.

3. The brake pad for a partially-lined disk brake as claimed in claim 2, wherein after a bending process of the damping plate, the bending region is configured as an oblique face in relation to the body region and to the bracket region.

4. The brake pad for a partially-lined disk brake as claimed in claim 3, wherein the bracket region is provided with an angled corner on a face opposite the bracket.

5. The brake pad for a partially-lined disk brake as claimed in claim 1, wherein a partial region of the bracket rests under preload against the front side of the back plate in the bracket region.

6. A method for producing a damping plate for a brake pad, the brake pad comprising a back plate and a friction lining arranged on a front side of the back plate, at least one guide end adjoining a body region of the back plate in a circumferential direction, wherein the guide end has an elevation such that a component thickness (D) of the guide end is increased in relation to a component thickness (d) of the body region, and a bracket formed integrally on the damping plate, the method comprising:
punching an unbent blank of the damping plate from flat sheet metal;
bending a bending region adjoining a body region so that a bracket surface of the damping plate that is defined on the bending region is parallel with and offset axially from a body surface of the damping plate in the body region of the back plate so that damping plate rests at least partially against a face of the elevation parallel to the back plate; and
bending over of the bracket so that the bent-over bracket is placeable against a radial support face of the guide end.

7. The method of claim 6, further comprising bending a partial region of the bracket over so that the partial region is placeable under preload against the front side of the back plate in the bracket region.

* * * * *